United States Patent [19]
Saito et al.

[11] Patent Number: 5,545,477
[45] Date of Patent: Aug. 13, 1996

[54] MAGNETO-OPTICAL RECORDING MEDIUM

[75] Inventors: Nobuhiro Saito; Masaki Takenouchi, both of Miyagi, Japan

[73] Assignee: Sony Corporation, Tokyo, Japan

[21] Appl. No.: 659,477

[22] Filed: Feb. 25, 1991

Related U.S. Application Data

[63] Continuation of Ser. No. 275,756, Nov. 23, 1988, abandoned.

[30] Foreign Application Priority Data

Nov. 25, 1987 [JP] Japan ................................ 62-296779

[51] Int. Cl.⁶ ........................... G11B 5/66; B32B 5/16
[52] U.S. Cl. ............... 428/332; 428/336; 428/694 ML; 428/694 SC; 428/694 RE; 428/694 DE; 428/900; 365/131
[58] Field of Search .................... 428/694, 900, 428/332, 336, 694 ML, 694 SC, 694 RE, 694 DE; 365/131; 430/945

[56] References Cited

U.S. PATENT DOCUMENTS

| 4,579,777 | 4/1986 | Honguu et al. | 428/900 |
| 4,666,789 | 5/1987 | Gueugnon et al. | 428/611 |
| 4,693,943 | 9/1987 | Kishi et al. | 428/694 |

FOREIGN PATENT DOCUMENTS

| 197965 | 10/1985 | Japan . |
| 52743 | 3/1987 | Japan . |
| 267944 | 11/1987 | Japan . |

Primary Examiner—Leszek Kiliman
Attorney, Agent, or Firm—Hill, Steadman & Simpson

[57] ABSTRACT

Anticorrosion magneto-optical recording medium is disclosed. The magneto-optical recording medium comprises a recording layer formed of an amorphous alloy of transition metal and rare-earth metal such as Tb—Fe or Tb—FeCo. On the recording layer, there are provided a transition metal layer such as FeCoCr alloy layer and a rare-earth metal layer such as Tb, in this order. Selective oxidation of rare-earth metal in the recording layer is effectively avoided by the existance of the layers.

10 Claims, 3 Drawing Sheets

MAGNETO-OPTICAL RECORDING MEDIUM

This is a continuation of application Ser. No. 07/275,756, filed Nov. 23, 1988, now abandoned.

BACKGROUND OF THE INVENTION

The present invention relates to a magneto-optical recording medium for use in a magneto-optical (thermal) recording process which records information with irradiation of, for example, a laser beam and reads out the recorded information by utilizing the magneto-optical Kerr effect of Faraday effect in the recorded portion of the medium.

Magneto-optical recording is considered to be prospective in view of high recording density.

In a magneto-optical recording medium, it is noted that a magnetic film serving as a magneto-optical recording film is composed of an amorphous magnetic alloy layer of rare-earth and transition metals, such as a Tb—Fe amorphous alloy layer, a Gd-Fe amorphous alloy layer or the like which can be easily formed by the technique of vacuum evaporation or sputtering and has an advantage of a high recording density without noise due to the crystal grain boundary.

Although such amorphous alloys have various advantages, there also exist some problems with regard to the anticorrosion property, since selective oxidation of the rare-earth elements, pitting corrosion and so forth are prone to occur.

Of the contrivances accomplished in an attempt to enhance the anticorrosion property of such magneto-optical recording medium, there is known an example disclosed in U.S. Pat. No. 4693943, wherein Cr is added to the recording layer itself. In the above recording medium, however, a disadvantage is apt to occur in respect to deterioration of the magneto-optical characteristic because of the fact that the composition of the magnetic layer itself serving as a recording layer is rendered different from the composition presenting the optimal magneto-optical characteristic.

OBJECTS AND SUMMARY OF THE INVENTION

Accordingly, it is an object of the present invention to provide a magneto-optical recording medium improved in anticorrosion property and avoiding corroded pit formation without deteriorating magneto-optical characteristics.

According to one aspect of the present invention, there is provided a magneto-optical recording medium which comprises a magneto-optical recording layer formed on a substrate, which layer is composed of magnetic alloy formed of transition metal and rare-earth metal, a transition metal thin layer and a rare-earth metal layer are superposed on the recording layer in this order, thereby constituting an improved recording medium which has excellent magneto-optical characteristics and sufficient anticorrosion property.

DESCRIPTION OF THE PREFERRED EMBODIMENTS

Figure 1:
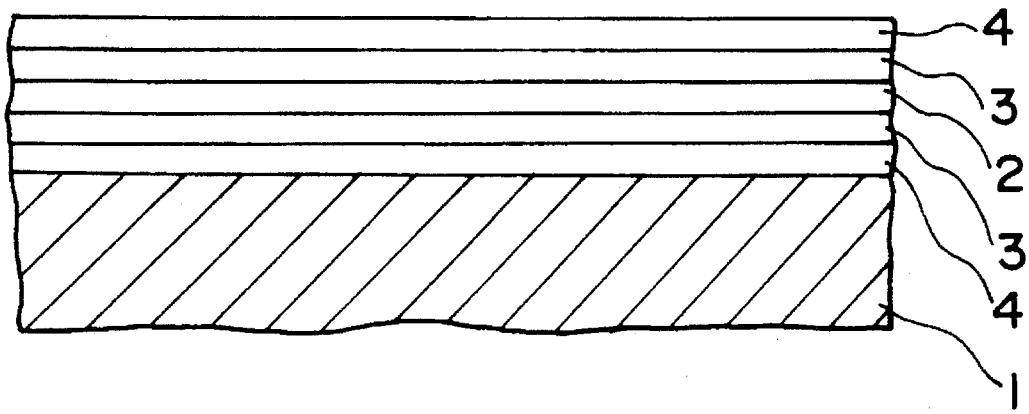
FIG. 1 is a schematic sectional view of a magneto-optical recording medium according to the present invention.

In the present invention, a rare-earth metal layer 4 is superposed through a transition metal layer 3 on a magnetic alloy layer 2 of rare-earth and transition metals formed on a base 1, as illustrated in FIG. 1.

According to the magneto-optical recording medium of the present invention, even, none of metals for the purpose of anticorrosion is added to the magnetic alloy layer 2 itself of rare-earth and transition metals serving substantially as a recording layer, and instead a rare-earth metal layer and a transition metal layer are superposed on such magnetic alloy layer, thereby enhancing the anticorrosion property without deterioration the magneto-optical characteristic of the recording layer. It has been further confirmed that improvements can be achieved n selective oxidation of the rare-earth element contained in the magnetic alloy layer 2 of rare-earth and transition metals serving substantially as a recording layer. Selective oxidation of the rare-earth metal is considered to result from the phenomenon that the rare-earth element such as Tb contained in the magnetic alloy of rare-earth and transition metals is attracted to oxygen and is thereby shifted to the surface to be selectively oxidized as a result. However, in the structure of the present invention where a rare-earth metal layer such as the Tb layer 4 is previously formed on the surface, it is presumed that, although the Tb layer 4 itself attracts oxygen strongly to be oxidized, the FeCoCr alloy layer, for example, as a transition metal layer in the first metal layer 3 formed between the Tb layer 4 and the magnetic alloy layer 2 of rare-earth and transition metals (hereinafter referred to as MO layer) acts to prevent intrusion of oxygen into the MO layer 2.

As shown in FIG. 1, a rare-earth metal layer 4, a transition metal layer 3, a MO layer 2, a transition metal layer 3 and a rare-earth metal layer 4 are formed to be superposed sequentially in this order on a substrate 1 composed of for example slide glass, glass plate, silicon water or plastic plate of PMMA (polymethyl methacrylate) resin or polycarbonate resin.

The MO layer 2, which is a magnetic alloy layer of amorphous rare-earth and transition metals, is deposited to a thickness of 1000 Å or so by the technique of evaporation, sputtering or the like, and each of the metal layers 3 and 4 is deposited to a thickness of 10 to 50 Å by the same process.

Embodiment 1

On a base 1 composed of slide glass, there are sequentially formed a 20 Å-thick rare-earth metal layer 4 composed of Tb, a 20 Å-thick transition metal layer 3 of FeCoCr alloy, a 900 Å-thick MO layer 2 having a composition of $Tb_{16.5}$, $Fe_{73.8}$, $CO_{3.9}$ and $Cr_{5.8}$, a 20 Å-thick transition metal layer 3 of FeCoCr alloy, and further a 20 Å-thick transition metal layer 4 composed of Tb. Such layers 2, 3 and 4 can be deposited by the technique of continuous sputtering based on a d.c. magnetron sputtering process. In this case, two targets of an FeCoCr alloy disc and a Tb disc are employed for the sputtering. The operation for continuously depositing the layers in sequence is performed by first discharging one target alone to form the Tb layer 4, subsequently discharging the other target alone to form the FeCoCr alloy layer 3 thereon, then using the two targets simultaneously to execute simultaneous sputtering to form the MO layer 2, thereafter discharging merely one target again to form the FeCoCr layer 3, and further discharging the other target alone to form the Tb layer 4 thereon. The sputtering conditions for the above operation are as follows:

| | | |
|---|---|---|
| Residual gas pressure | $1.0 \times 10^{-6}$ Torr | |
| Ar gas pressure | $3.0 \times 10^{-3}$ Torr | |
| Discharge power | FeCoCr target | 600 W |
| | Tb target | 450 W |
| Presuputtering time | 5 minutes | |

Comparative Example 1

In this example, tile positional relationship between the FeCoCr layers 3 and the Tb layers 4 in the structure of Embodiment 1 is inverted so that the Tb layers 4 are in contact with the MO layer 2, and the FeCoCr layers 3 are superposed on the two surfaces of the MO layer 2 through the Tb layers 4.

Figure 2:
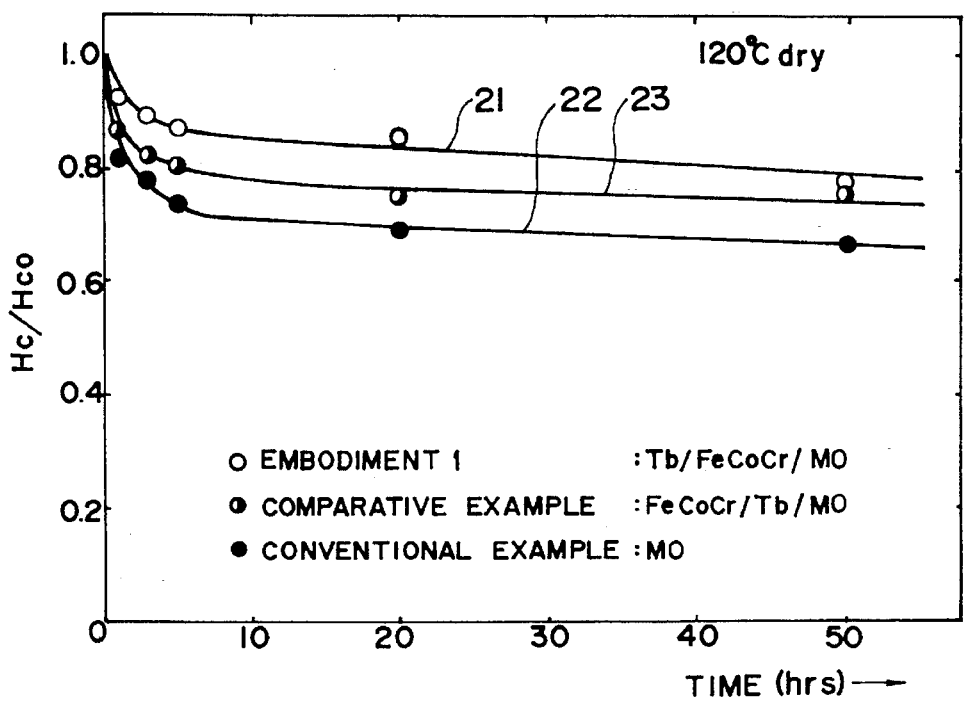
FIGS. 2 and 3 graphically show the results of measuring the changes in the magnetic characteristics of the recording medium.
Figure 3:
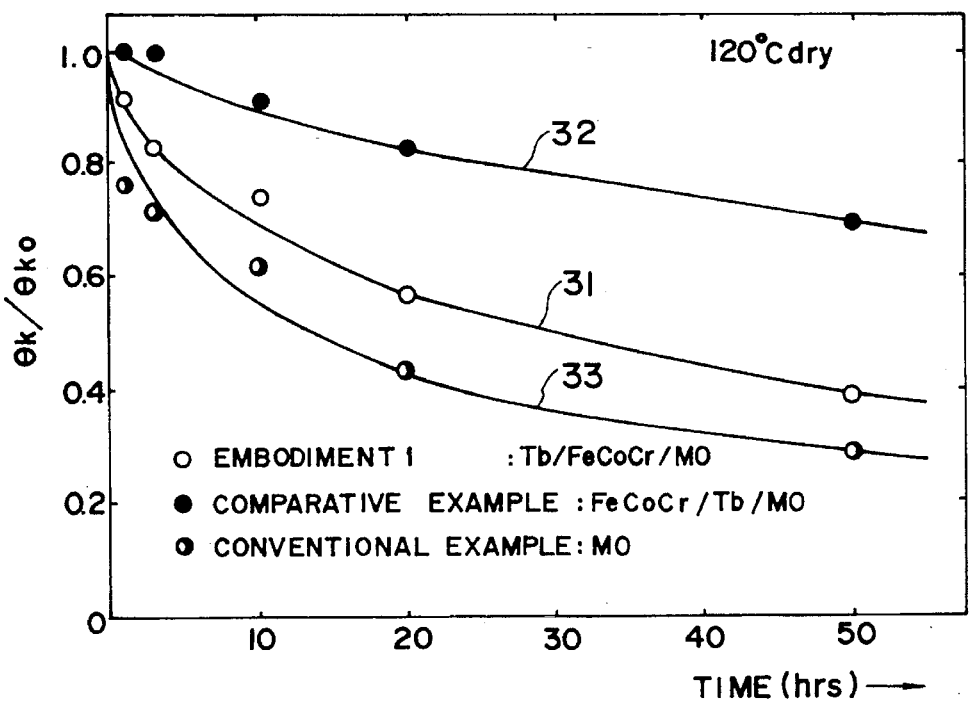

Table 2 and FIGS. 2 through 4 show the results of evaluation carried out with regard to the respective magneto-optical characteristics and anticorrosion properties of Embodiment 1, Comparative example 1 and a conventional example having a single MO layer.

TABLE 2

| | Coercive force Hc (kOe) | Kerr rotation angle θk (deg) | Polarization resistance (kΩ · cm$^2$) |
|---|---|---|---|
| Embodiment 1 | 4.38 | 0.23 | 40.0 |
| Comparative example 1 | 4.65 | 0.20 | 9.0 |
| Conventional example 1 | 4.08 | 0.23 | 9.9 |

According to the results listed in Table 2 above, in the structure of Comparative example 1 where the Tb layer is formed in contact with the MO layer 2 and the FeCoCr layer is disposed on the obverse side of the latter, the characteristics of the magnetic layer are deteriorated with respect to both the Kerr rotation angle θk and the polarization resistance thereof. Meanwhile, in Embodiment 1 of the present invention where the Tb layer 4 is disposed on the obverse side of the MO layer 2 through the FeCoCr layer 3, the polarization resistance can be increased about four times, without causing deterioration of the Kerr rotation angle θk, as compared with the conventional example having merely a single MO layer.

FIGS. 2 and 3 graphically show the results of experiments carried out for testing the selective oxidation under dry atmosphere condition at 120° C. The former represents the relationship between the coercive force (Hc) reduction rate Hc/Hco (where Hco is the initial coercive force) and the shelf-test time in environment; and the latter represents the relationship between the angle (θk) reduction rate and the shelf-test time in environment. The environment for such measurements was dry air at 120° C. In FIGS. 2 and 3, curves 21 and 31 correspond to Embodiment 1, curves 22 and 32 to Comparative example 1, and curves 23 and 33 to Conventional example, respectively.

As is obvious from FIG. 2, the variation of the coercive force Hc in Embodiment 1 of the present invention is smaller than that in Comparative example 1 and Conventional example, indicating that the selective oxidation is effectively averted. It signifies that, in Embodiment 1, intrusion of oxygen into the MO layer 2 is prevented as mentioned above. However, in Comparative example 1 where the FeCoCr layer is formed through the Tb layer on the MO layer 2, as well as in Conventional example having a single MO layer, the Tb layer serving as an intermediate layer exerts a great force to attract oxygen, so that the oxygen is allowed to intrude into the Tb layer via the FeCoCr transition metal layer and is further delivered to the MO layer 2 to consequently induce selective oxidation.

Viewing the reduction rate of the Kerr rotation angle θk shown in FIG. 3, there are observed some improvements in both Embodiment 1 and Comparative example 1 as compared with Conventional example having a single MO layer.

Figure 4A:
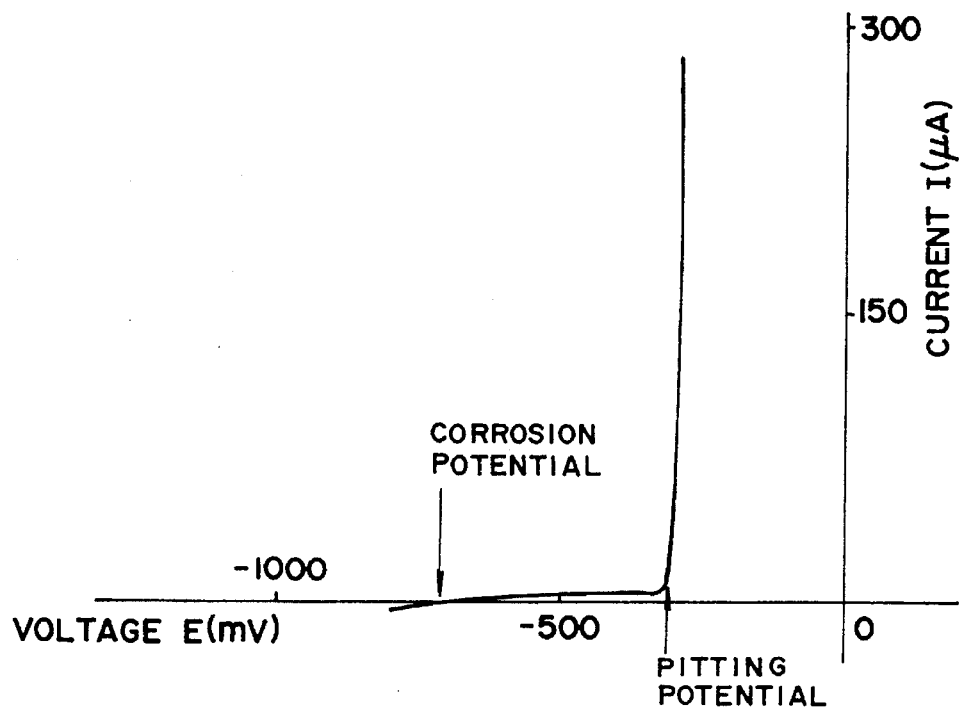
FIGS. 4A and 4B graphically show the results of measuring the potential E-to-current I characteristics.
Figure 4B:
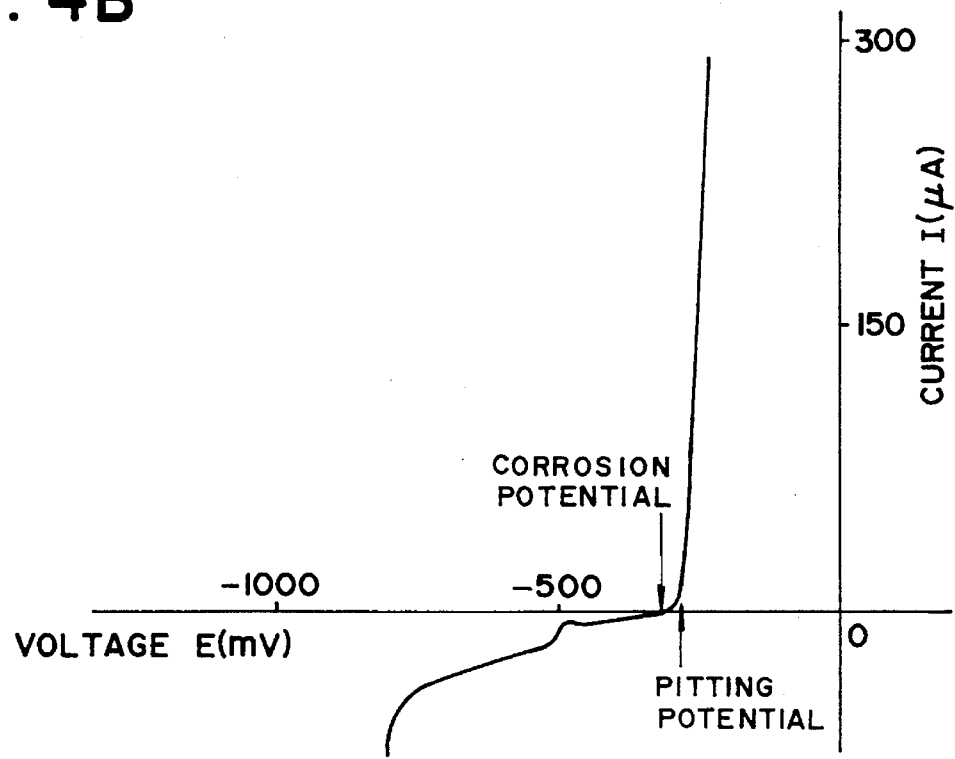

FIGS. 4A and 4B graphically show the results of measuring the respective corrosion potentials and pitting potentials in Embodiment 1 and Comparative example 1. As is manifest from the comparison between FIGS. 4A and 4B, the pitting potential (any level exceeding this causes pitting) in Comparative example 1 is substantially the same, but the corrosion potential in Embodiment 1 of the present invention is lower by 400 mV or so due to the structure where the Tb layer is formed on the obverse side. Fundamentally, higher stability is achieved against corrosion reaction as the corrosion potential becomes higher. However, in case the difference between the corrosion potential and the pitting potential is small, pitting is prone to occur with extreme readiness. That is, when the surface layer is a Tb layer as in Embodiment 1, the corrosion potential is low so that the difference between the corrosion potential and the pitting potential is rendered great to eventually prevent ready occurrence of pitting. It has been found that the relationship between the corrosion potential and the pitting potential in the presence of a single MO layer alone is the same as that in FIG. 4B.

In addition to the above exemplary embodiment where the layers 2, 3 and 4 are formed by the technique of sputtering respectively, such layers may be formed by vacuum evaporation as well.

It is also to be understood that a protective layer, a reflective layer or the like may be deposited on the uppermost layer or between the transition metal layer 3 and the base 1.

According to the structure of the present invention, as described hereinabove, the anticorrosion property can be improved without causing deterioration of the magneto-optical characteristic in the recording magnetic alloy layer of rare-earth and transition metals where a problem has been existent with respect to the anticorrosion property, hence attaining remarkably great advantages in practical use.

We claim as our invention:

1. A magneto-optical recording medium on a base comprising:

a magneto-optical recording layer being formed on the base and being formed of a TbFeCo amorphous alloy;

a first layer of a FeCoCr alloy being formed on said magneto-optical recording layer;

a second layer of Tb being formed on said first layer; and both the first layer and the second layer each having a thickness of between 10 Å and 50Å.

2. A magneto-optical recording medium on a base comprising:

a magneto-optical recording layer being formed of a TbFeCoCr amorphous alloy and being formed on the base;

a first layer of FeCoCr alloy being formed on said magneto-optical recording layer;

a second layer of Tb being formed on said first layer; and each of said first and second layers having a thickness in a range of 10 Å to 50 Å.

3. A magneto-optical recording medium comprising:

a magneto-optical recording layer formed of an amorphous alloy selected from a group consisting of TbFeCo amorphous alloy and TbFeCoCr amorphous alloy, a first protective layer being formed on a surface of said magneto-optical recording layer, said first protective layer being an alloy of transition metal elements, and a second protective layer consisting of Tb being formed on said first protective layer.

4. A magneto-optical recording medium according to claim 3, wherein said first protective layer is a FeCoCr alloy.

5. A magneto-optical recording medium according to claim 3, wherein each surface of the recording layer is covered by the first protective layer and each first protective layer is covered by a second protective layer.

6. A magneto-optical recording medium according to claim 3, wherein each of said first and second protective layers has a thickness in a range of 10 Å to 50 Å.

7. A magneto-optical recording medium according to claim 6, said first layer having a thickness between 10 and 50 Å.

8. A magneto-optical recording medium according to claim 5, wherein each of said first and second protective layers has a thickness of between 10 Å and 50 Å.

9. A magneto-optical recording medium according to claim 7, said second layer having a thickness between 10 and 50 Å.

10. A magneto-optical recording medium according to claim 8, wherein each first protective layer is a FeCoCr alloy.

* * * * *